(No Model.) 6 Sheets—Sheet 1.

C. H. TRASK.
BOOT OR SHOE SOLE AND HEEL TRIMMING MACHINE.

No. 357,738. Patented Feb. 15, 1887.

(No Model.)

C. H. TRASK.
BOOT OR SHOE SOLE AND HEEL TRIMMING MACHINE.

No. 357,738. Patented Feb. 15, 1887.

WITNESSES
J. M. Dolan.
Fred. B. Dolan.

INVENTOR
Chas. H. Trask
by his atty
Clarke & Raymond (No Model.) 6 Sheets—Sheet 4.

C. H. TRASK.
BOOT OR SHOE SOLE AND HEEL TRIMMING MACHINE.

No. 357,738. Patented Feb. 15, 1887.

WITNESSES.
J. M. Dolan.
Fred. B. Dolan.

INVENTOR.
Chas. H. Trask
by his atty
Clarke L. Raymond.

N. PETERS, Photo-Lithographer, Washington, D. C.

(No Model.) 6 Sheets—Sheet 5.

C. H. TRASK.
BOOT OR SHOE SOLE AND HEEL TRIMMING MACHINE.

No. 357,738. Patented Feb. 15, 1887.

WITNESSES. INVENTOR.

UNITED STATES PATENT OFFICE.

CHARLES H. TRASK, OF LYNN, MASSACHUSETTS.

BOOT OR SHOE SOLE AND HEEL TRIMMING MACHINE.

SPECIFICATION forming part of Letters Patent No. 357,738, dated February 15, 1887.

Application filed June 7, 1886. Serial No. 204,324. (No model.)

*To all whom it may concern:*

Be it known that I, CHARLES H. TRASK, of Lynn, in the county of Essex and State of Massachusetts, a citizen of the United States, have invented a new and useful Improvement in Boot or Shoe Sole or Heel Trimming Machines, of which the following is a full, clear, and exact description, reference being had to the accompanying drawings, forming a part of this specification, in explaining its nature.

The invention relates to a machine organized to embrace or contain a sole-edge-trimming cutter or knife, a heel-edge-trimming cutter or knife, and a shank-edge-trimming cutter or knife, preferably so arranged or located in relation to the frame of the machine and to each other that the operator may present the work to the various cutters or knives in successive order without changing his position or balance.

The invention comprises, among other things, the arrangement or location of these three cutters or knives in relation to each other and to the frame of the machine so that they shall occupy an operative position upon one side of the machine and close to each other, and so that the cutters shall not interfere with the necessary turning of the boot or shoe as it is presented successively to the various cutters.

It relates, second, to the manner of supporting the three cutters and the arrangement of their operative shafts and pulleys, whereby they are all rotated by one belt; third, to yielding or movable guards for covering the shank-edge cutter or knife and the sole-edge cutter or knife when not in use, and which automatically assume such protective position upon the removal of the work from the cutter; fourth, to the construction and manner of mounting the heel-trimming cutter or knife; fifth, to the rand-cutter used in connection with the heel-trimming cutter or knife and the manner of adjusting and operating it; sixth, to the top-lift guide used in connection with the heel-trimming cutter and the manner of mounting and adjusting it.

The invention further relates to a rand or welt knife used in connection with a shank-edge trimmer and the manner of providing it with necessary adjustments and for operating it; also, to the form or shape of the shank-edge trimmer.

It further relates to various other details of construction and organization.

Referring to the drawings, Fig. 4 is a plan view thereof. Fig. 13 is a view in front elevation of the outer section or part of the heel-trimming cutter or knife.

24 is a diagram, to which reference is hereinafter made.

Heretofore it has been customary to trim the sole-edge and shank-edge of a boot or shoe before the attachment of its heel thereto, and after the attachment of the heel to trim the heel-edge. This manner of doing the work has necessitated the use of at least two machines and the handling of the boot or shoe a large number of times and by many different workmen, and the carrying or transferring of the boot or shoe from one part of the shop to another, and from one operator to another. Aside from this, the trimming of the edge of the sole before the attachment of the heel is objectionable in that the trimmed edge is very likely to be marred or defaced during the subsequent handling of the boot or shoe, and also while the heel is being fastened or attached thereto. I have ascertained that these various trimming operations—namely, the entire trimming of the sole-edge and the complete trimming of the shank-edge—can be done after the heel has been attached, but that for doing the work in this way a shank-cutter must be employed of a different form from that now used. I have also ascertained that the three operations of sole-edge trimming, shank-edge trimming, and heel-edge trimming can be performed upon one machine by one operator at one handling and at the same time, and that in order to accomplish this it is necessary to arrange or locate the cutters in relation to each other so that the work can be presented safely to each cutter without interfering with or coming in contact with the other cutters.

Figures 1, 2:
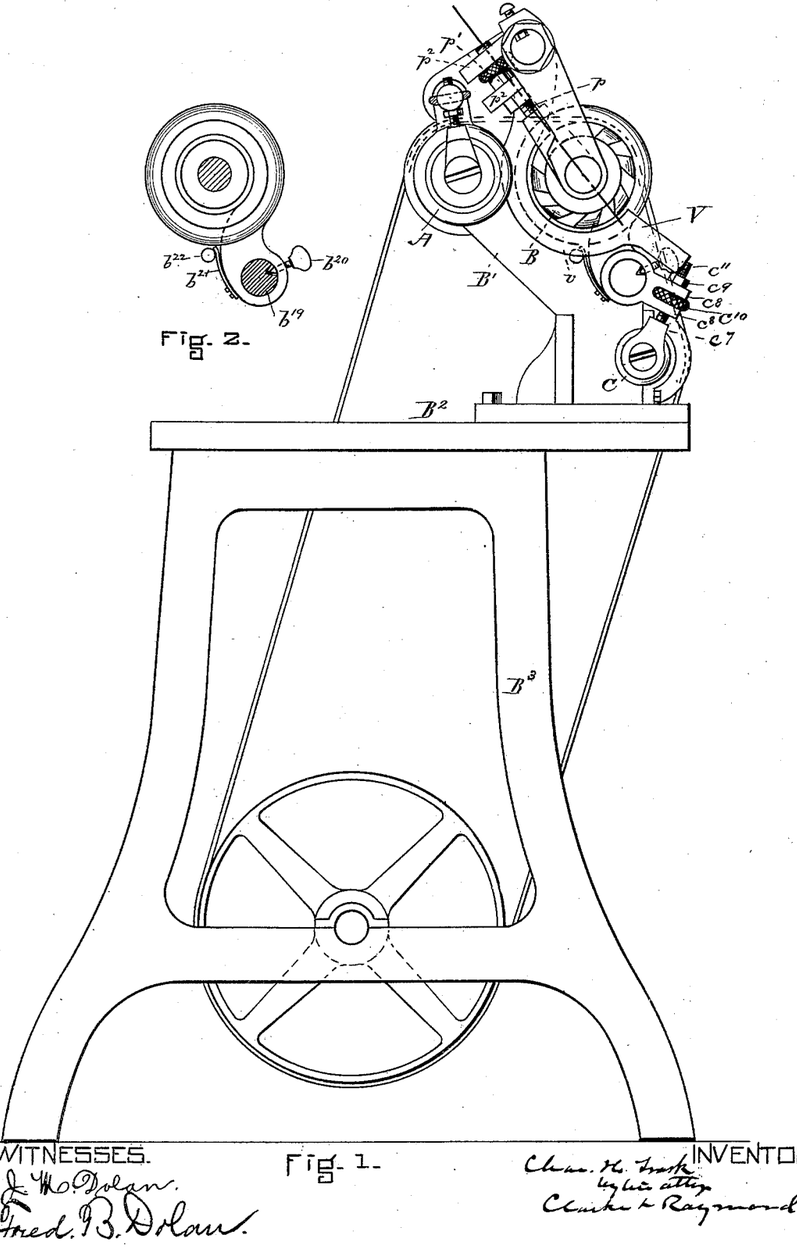
Figure 1 is a front elevation of a machine containing the features of my invention.
Fig. 2 is a detail view in vertical section and elevation to illustrate the top-lift guide of the heel-trimming cutter and the manner of its adjustment.
Figure 3:
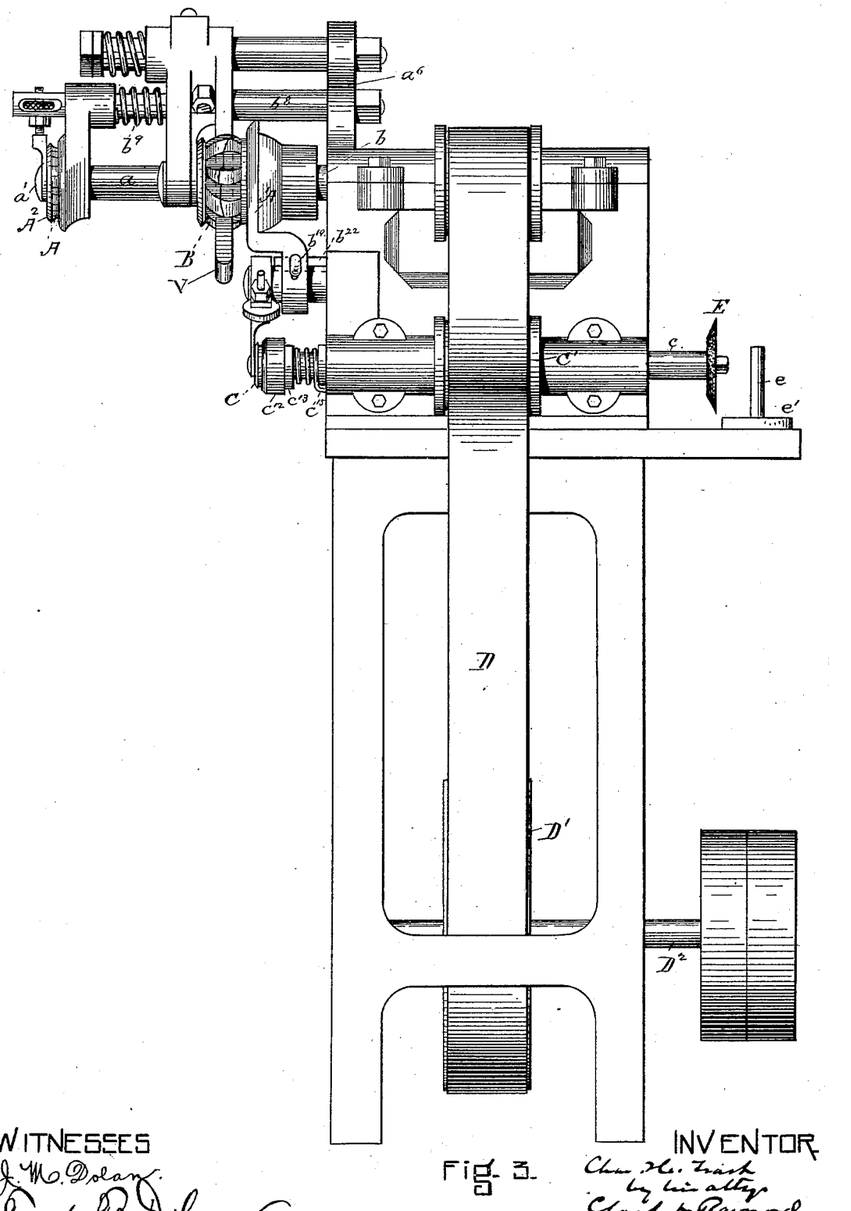
Fig. 3 is a side elevation of the machine to the right of the front.
Figures 4, 24:
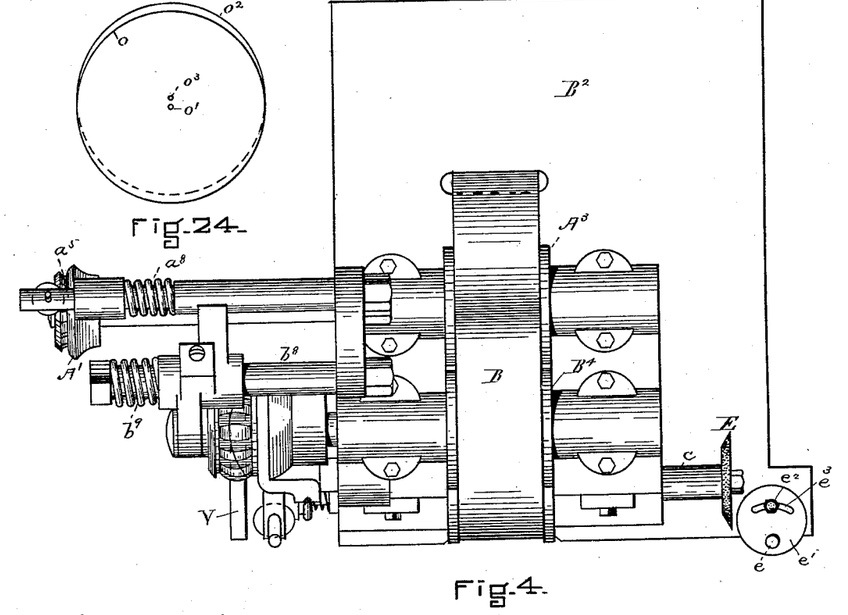
Figures 6, 7:
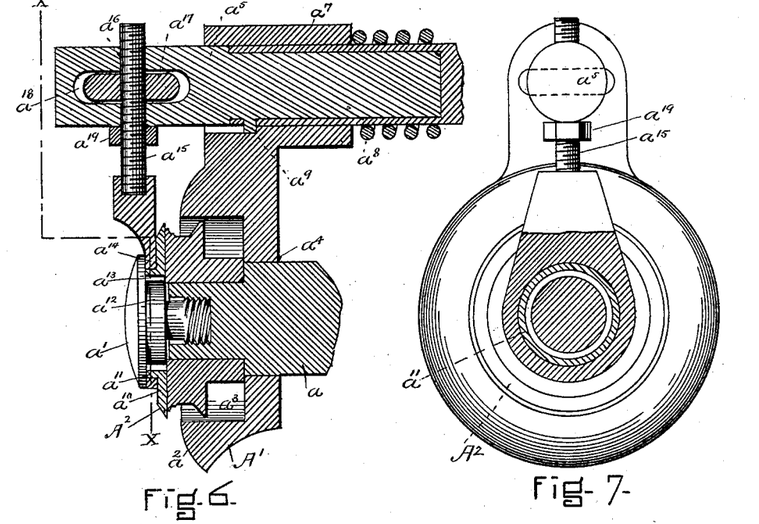
Fig. 6 is a view in section to illustrate the sole-edge trimmer, the rand-guard, the cover or protector of the trimmer, and various parts connected therewith.
Fig. 7 is a view in section upon the line $x\ x$ of Fig. 6, showing in elevation the parts beyond said line.

The best arrangement of the various cutters and trimming devices in relation to each other is, I think, that which I have herein represented, and which is well shown in Figs. 1, 3, and 4 of the drawings, where the sole-edge cutter or trimmer A is represented as occupying a position to the left of the heel-edge trimmer or cutter B, and substantially upon the same level therewith, but in advance of it, while the shank-edge cutter or trimmer C occupies a position to the right of the heel-edge cutter or trimming device, somewhat below it and behind it, or at the rear of a vertical plane intersecting the heel trimmer or cutter. The sole-edge cutter A may be of any desired shape, form, or style, and I have represented in the drawings the form usually employed on the Busell machine. It is represented in section in Fig. 6, and the rand-cutter is integral therewith. This sole-edge cutter is mounted upon the end of the horizontal shaft $a$, being secured thereto by the headed bolt or screw-stud $a'$. It is inclosed and guarded when not in use by the hood or guard A′, which preferably is circular in shape, provided with a rounded edge, $a^2$, and cavity or recess $a^3$ of sufficient depth to well cover the cutter, and has a hole, $a^4$, through which the shaft $a$ extends, and upon which shaft the guard is movable. The guard is suspended from and held from rotating or turning by the horizontal rod $a^5$, which extends outward from the support or bracket $a^6$, and it is made horizontally movable thereon, being provided with a sleeve, $a^7$, cast integral with the remainder of the guard, and which surrounds the said rod $a^5$. A coil-spring, $a^8$, also surrounds the rod $a^5$ and bears at one end against the shoulder thereon, and at the other end against the sleeve $a^7$, and it serves to maintain the guard A′ in position over the cutters when the cutter is not in use, and to automatically return the guard to such position when it has been moved to expose the cutter, as hereinafter described.

The pin $a^9$ limits the extent of the outward movement of the sleeve, and consequently of the guard, and prevents it from coming in contact with the cutter.

In use the sole of the boot or shoe is placed against the face $a^2$ of the guard, and it is moved backward upon the shaft $a$ and rod $a^5$ in opposition to the spring $a^8$ until the cutter is exposed sufficiently to trim the edge of the sole, and upon the removal of the shoe from the cutter the spring $a^8$ automatically moves the guide back to its normal position. The rand-guide A² is interposed between the cutter and the head $a'$ of the bolt or screw-stud, and it is made adjustable in relation to the part of the cutter against which the sole-edge is held, and which is the under part of the cutter, in order that it may be moved into proper position as the cutter becomes worn by grinding. To accomplish this, the guide is formed upon the edge of a disk, $a^{10}$, which has a sleeve extending laterally therefrom, and which surrounds the enlarged section $a^{12}$ of the bolt or stud $a'$, the disk having the hole $a^{13}$ of a size considerably larger than the size of the said section $a^{12}$. Between the disk and the head of the bolt or stud there is arranged a slide-plate, $a^{14}$, having a hole of sufficient size to receive the sleeve $a^{11}$ of the disk $a^{10}$, so that the disk is supported by the slide-plate. This plate has an arm extending upwardly, and is made vertically adjustable or movable by means of a screw, $a^{15}$, which passes through a hole, $a^{16}$, formed in the end of the rod $a^5$, and a nut, $a^{17}$, which is confined or held in a slot, $a^{18}$, across the said rod, and through which said screw $a^{15}$ passes, and by this means the rand-guide is lifted or lowered, as may be desired, for the purposes of properly adjusting it, and after it has been so located and locked a nut, $a^{19}$, upon the screw $a^{15}$ serves to lock the slide-plate rigidly to the rod $a^5$.

The horizontal shaft $a$, together with the horizontal shaft $b$, carrying the heel-edge trimmer B, and the horizontal shaft $c$, carrying the shank-edge trimmer C, are parallel with each other, and are mounted in suitable boxes or bearings supported by the bracket B′, and this bracket is bolted to the bed B² of the frame B³. The sliding sole-edge-trimmer shaft $a$ has between its bearings the driven pulley A³, the sliding heel-edge-trimmer shaft B has between its bearings the driven pulley $B^4$, and the sliding shank-edge-trimmer shaft C has between its bearings the driven pulley $C'$, which is also in line with the driven pulleys $A^3 B^4$, and these pulleys are so arranged in relation to each other and to the driving-pulley $A'$ on the main shaft $A^2$ that one belt, D, serves to operate or turn all the shafts and in the same direction.

Figure 5:
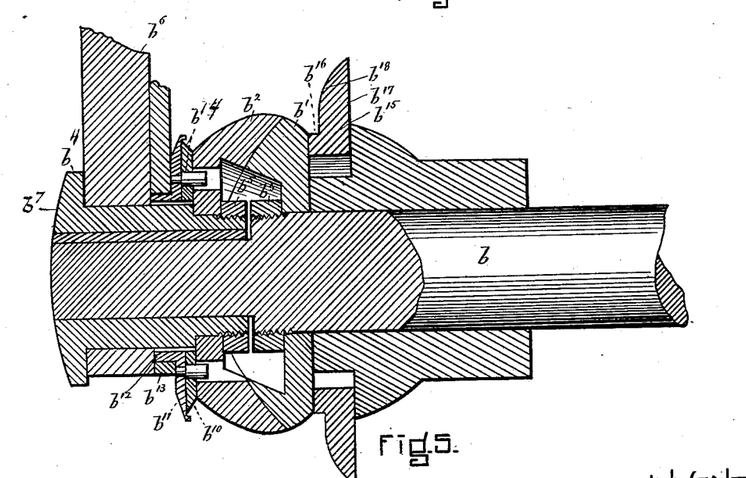
Fig. 5 is a vertical section, enlarged, of the sole-edge trimmer, the rand-guide, and devices for mounting it and adjusting it, and also of the movable sole-edge-trimmer hood or protector.
Figures 14, 15, 16, 17, 18, 19, 20:
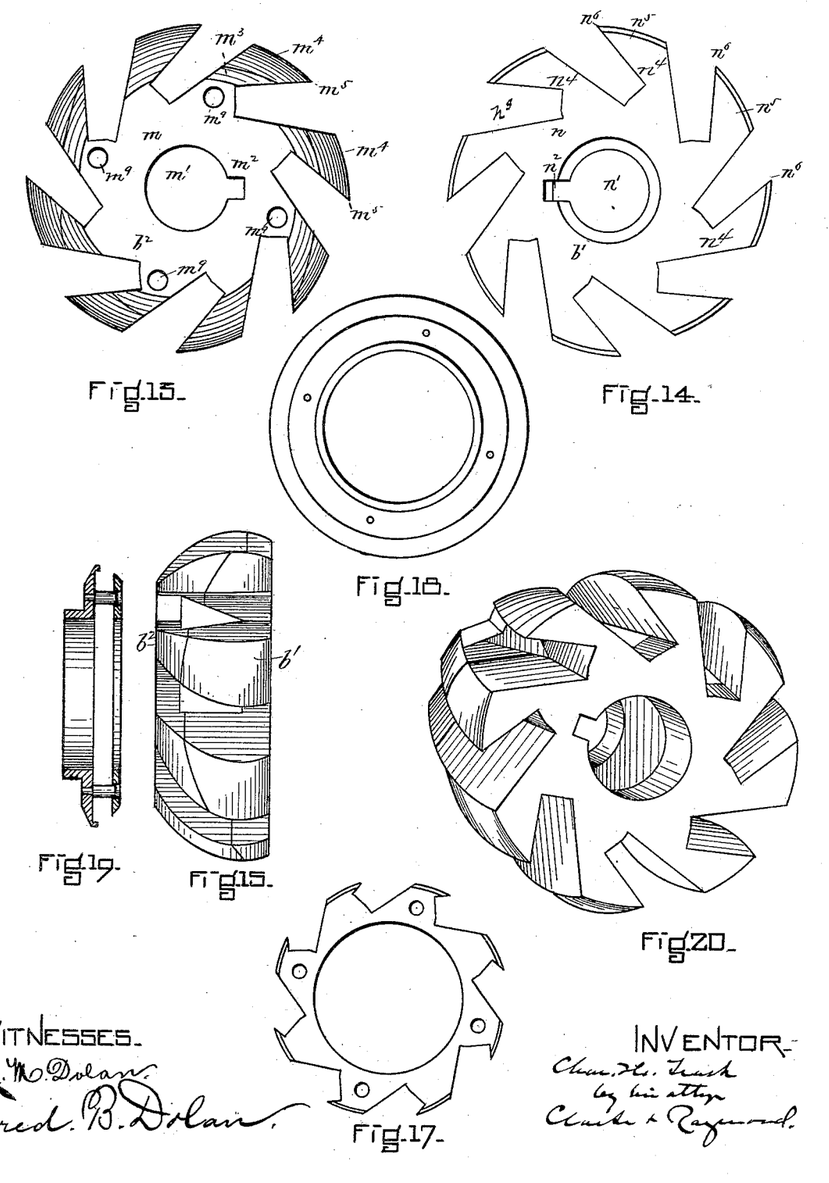
Fig. 14 is a view in elevation of the inner section or part thereof.
Fig. 15 is a view in side elevation, showing the two sections or parts of the heel-trimming cutter together.
Fig. 16 is also a view in side elevation of the said parts or sections of the heel-trimming cutter, showing them slightly separated.
Fig. 17 is a view in front elevation of the heel-rand knife.
Fig. 18 is a view in elevation of the heel-rand guide.
Fig. 19 is a view in vertical section of the heel-rand guide and of the heel-rand knife or cutter separated.
Fig. 20 is a perspective view of the two parts of the cutter together.
Figure 16:
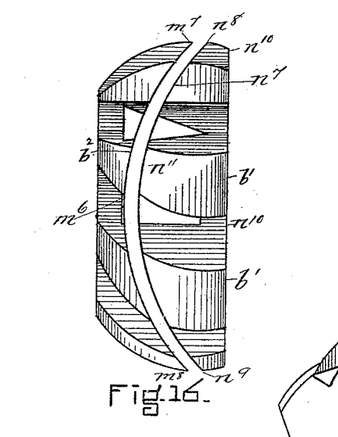
Figure 21:
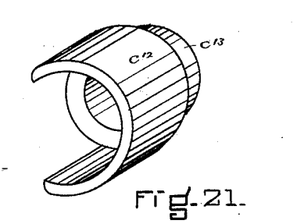
Fig. 21 is a view in perspective of the shank-edge cutter.
Figure 22:
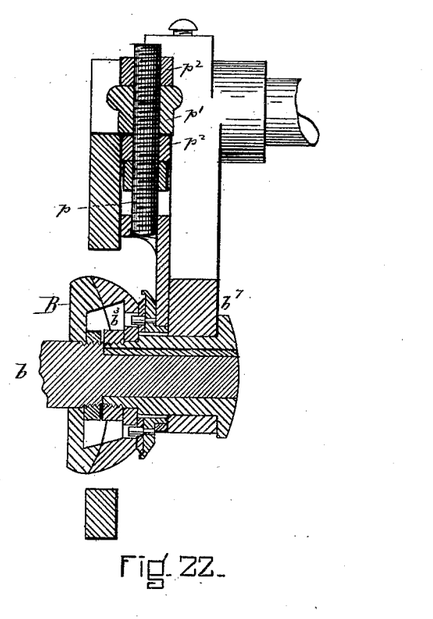
Fig. 22 is a vertical section through the heel-edge cutter and attachments, to illustrate the method of adjusting the rand-knife and rand-guard.
Figure 23:
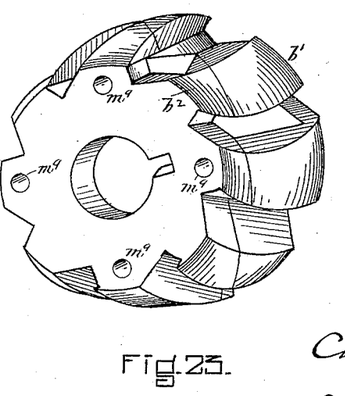
Fig. 23 is another view in perspective of the heel-edge cutter. Fig.

The heel trimmer or cutter B may be of any desired shape or form. That which I have shown is a two-part cutter, and it is mounted upon the end of the shaft $b$. (See Figs. 1, 3, 4, and 5.) $b'$ is the inner section or part of the cutter, and $b^2$ is the outer section or part. The inner part, $b'$, is shaped, preferably, substantially as shown in Figs. 5, 15, and 16, and it in substance comprises a disk, $n$, having a hole, $n'$, to fit the shaft $b$, and from which a recess, $n^2$, for a fast feather extends. The disk has a series of recesses, $n^3$, formed therein, which are tangential to its outer edge, and they form a series of arms, $n^4$, and these arms have extending laterally therefrom the outwardly rounded or curved teeth $n^5$, the edges $n^6$ of which form the cutters of this section of the heel-trimmer. These teeth $n^5$ are shaped upon their side edges, $n^7$, to form an arc of a circle extending from the point $n^8$ of the part to the point $n^9$ of the part, as represented in Fig. 16. Of course, this shape provides teeth varying in operative length from the shortest teeth between the points $n^8$ $n^9$ and the back edge, $n^{10}$, of the cutter and the wide teeth which extend from the point $n^{11}$ to the back edge, $n^{10}$, of the cutter. The teeth are also, as above intimated, curved outwardly from the back edge, $n^{10}$, to the line $n^7$. The other section, $b^2$, of the cutter is shaped and has substantially the same features as the section $b'$. It is shown in Figs. 5, 13, 15, and 16. It comprises a disk, $m$, having the shaft-hole $m'$ and fast-feather recess $m^2$. It has arms $m^3$ and teeth $m^4$, having cutting-edges $m^5$, which are like similar parts of the section $b'$ of the cutter, with this exception, that the inner edge of the teeth $m^6$ to the point $m^7$ is curved inwardly, the converse of the edge $n^8$ to $n^9$ of the part $b'$, so that the wider teeth of the section $b^2$ when the two parts of the cutter are together come opposite the narrow teeth of the section $b'$, as represented in Figs. 5, 15, and 16. The section $b^2$ of the cutter also has formed in it the holes $m^9$ to receive pins extending from the rand-cutter, as hereinafter described. The part $b'$ of the cutter is fastened upon the shaft against a stop or shoulder formed thereon by the nut $b^3$, which screws upon the shaft and against the surface of the cutter-disk. The part $b^2$ of the cutter is fastened to a sleeve, $b^4$, by a nut, $b^5$. The sleeve is arranged to inclose the end of the shaft $b$, and is splined thereto, so as to be moved horizontally thereon, so as to permit of the horizontal movement of the section $b^2$ of the cutters in relation to the section $b'$. This horizontally-movable sleeve $b^4$ is secured or attached to an arm, $b^6$, the sleeve passing through a hole in the end of the arm and having a head, $b^7$, which bears against the outer surface of the arm.

The arm $b^6$ extends upward and is provided with a hole to receive the rod $b^8$, which extends outward from the bracket $a^6$, and upon which rod it is movable, being moved outward thereon against the stress of the coil-spring $b^9$, which surrounds the rod $b^8$ upon the opening movement of the two parts or sections $b'$ $b^2$ of the cutter, which are caused to open in relation to each other, as hereinafter specified, and being returned to its normal or original position by the coil $b^9$. In other words, the spring $b^9$ holds the movable section $b^2$ of the cutter against the section $b'$, and serves to hold the rand-guide against the work and to return it and the movable section $b^2$ of the cutter to their original position after the work has been removed.

There is arranged between the movable section $b^2$ of the cutter and the arm $b^6$, and so as to surround the sleeve $b^4$, the rand-knife $b^{10}$ and the rand-guard $b^{11}$, and they are horizontally movable with the section $b^2$ of the cutter, and are also made vertically adjustable. The rand-knife and rand-guard are arranged to be revolved with the cutter, and they are connected as hereinafter explained.

The rand-guard proper is the lower edge of the disk upon which it is formed. This disk has a hole larger than the sleeve $b^4$, and an outward-extending hub, $b^{12}$, arranged to enter a hole in the slide plate or arm $b^{13}$, by which it is made vertically adjustable and in which it turns. The disk also has the pins $b^{14}$, which extend through holes formed in the rand-knife disk, and into the enlarged holes $m^9$, formed in the disk of the section $b^2$ of the cutter. It is obvious that a rotary motion will thus be imparted to the rand-knife and rand-guard by the section $b^2$ of the cutter; but as it is necessary that the cutting-point of the rand-cutter, or that point at which the work is presented to it, and the rand-guide or that point which comes in contact with the rand or outsole, should always bear substantially the same relation to the edge of the heel trimmer or cutter, it follows that the rand cutter and guard must be moved to bring them into another or new position, and consequently it is necessary to connect these parts with the cutter, so that they may rotate upon a center different from the center of the heel-trimmer, which center is the center of the rand-guard disk, and which of course is movable as the disk is moved by the slide-plate $b^{13}$. This difference in the centers of rotation of the rand-cutter and of the rand-guide I have shown by a diagram in Fig. 24, where the line $o$ represents the circle of revolution of the heel cutter or trimmer, and $o'$ its center, and $o^2$ represents the circle of rotation of the rand knife and guide, and $o^3$ its center. To enable this result to be obtained it is necessary that the holes $m^9$ and section $b^2$ should be made considerably larger than the pins $b^{14}$, which enter them, and so that they may move eccentrically therein as the cutter is revolved. The slide-plate $b^{13}$ is made vertically adjustable by means of a screw, $p$, formed thereon to enter the adjusting-nut $p'$, held by the arms $p^2$, extending from the sleeve of the arm $p^6$.

As the rand-cutter does not wear near as rapidly as the heel-edge trimmer, it is desirable to provide it with the movement in relation to the heel-trimming cutter described.

There is arranged behind the section $b'$ of the heel-trimmer the top-lift guide $b^{15}$, which comprises in substance a disk having a hole sufficiently large to surround the collar, so as to be movable laterally or horizontally, as hereinafter described, in relation to the heel-cutter. This disk has a top-lift-guiding surface or shoulder, $b^{16}$, and an extension, $b^{17}$, having a rounded surface, $b^{18}$, which forms in effect a rest for the bottom of the heel. The disk has an arm extending downward therefrom, which is provided with a hole to fit the horizontal rod $b^9$, which extends from the bracket B' of the machine, and it is adapted to be moved or swung thereon to adjust the top-lift guide $b^6$ to the cutter and then to be rigidly locked or fastened in place by the screw $b^{20}$, if desired, in which case I prefer to fasten it to the arm thereof and to arrange it to bear against a pin, $b^{22}$.

In use the top lift of the heel to be trimmed is placed against the top-lift guide $b^{16}$ and the rand-piece brought against the rand-guard. The shoe is then turned in relation to the cutter, and the two parts thereof are automatically separated and closed by the variation in the length of the trimming-surface of the heel as it is turned. It is desirable, generally, to provide a rest upon which the side edge of the heel may be supported while it is being turned or presented to the cutter, and I prefer to employ a rest which is made movable horizontally with the movable section or part of the cutter, and I have represented such a rest in Figs. 1, 3, and 4. This rest V is formed upon the end of an arm, $v$, curved to surround the cutter, and extending downward from the rod or support $b^8$, and this arm is connected with the arm $b^6$, which carries the sleeve supporting the movable section $b^2$ of the heel-trimmer, and preferably I form this arm $v$, the supports $p^2$ for the adjusting-nut $p'$, and the arm $b^6$ integral or in one casting, and thus provide it with a long bearing upon the shaft rod or support $b^8$. It is obvious that by this construction the heel-rest V is made horizontally movable with the movable part $b^2$ of the heel-trimmer, and with the rand-guard and rand-knife, and this construction I find to be advantageous, because it insures a proper movement of the heel in relation to the section $b'$ of the cutter without causing the heel to drag upon the rest and without disturbing or disengaging the rand-guard from the rand-crease. Of course, if the section $b'$ be a movable section instead of the section $b^2$, the top-lift guide would then be made movable, and in that event the rest V would be attached to it so as to be movable with it.

Figure 8:
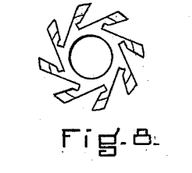
Fig. 8 is a view of my improved shank-edge cutter in front elevation.
Figure 9:
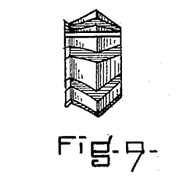
Fig. 9 is a view thereof in side elevation.
Figure 10:
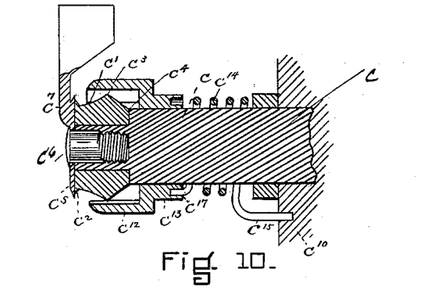
Fig. 10 is a vertical section, enlarged, of the shank-edge cutter, the welt-guide, and the shank-edge-cutter hood or protector.
Figure 11:
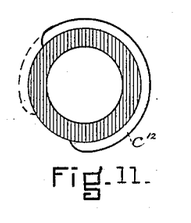
Figs. 11 and 12 represent views of the protector or hood of the shank-edge cutter, reference to which is hereinafter made.
Figure 12:
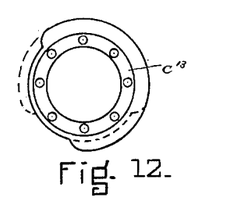

The shank-edge cutter is shown in Figs. 8, 9, and 10. It is mounted upon the end of the shaft $c$, and it has the edge-cutting section $c'$ and the rand-cutter $c^2$, which is represented as formed integral therewith. It will be seen that the edge-cutting section extends from the rand-cutter to the point $c^3$, and that the cutter is beveled or cut down from that point to the point $c^4$, and I have ascertained that a cutter having this general shape can be used in trimming the edge of the shank after the heel has been secured in place, as it allows the cutter to follow the edge of the shank to the breast of the heel. $c^5$ is the rand-guide of the shank-cutter. It is vertically adjustable in relation to the cutter C and the stud $c^6$, which fastens the cutter to the end of the shaft. It has a slide-arm, $c^7$, which is supported by means of the arm $c^8$, which extends from a collar fastened to the rod $b^{19}$. This arm $c^7$ has a screw-stem, $c^9$, which passes through holes in the said arm $c^8$ and nut $c^{10}$, which is held by said arm. A check-nut, $c^{11}$, serves to lock the guide in place after it has been adjusted. The cutter is covered by a guard, $c^{12}$, which is arranged to turn in relation thereto. It has one side cut away, as represented in Figs. 11 and 12, has a sleeve, $c^{13}$, which surrounds the shaft $c$, and it is adapted to be turned thereon in opposition to the coil-spring $c^{14}$, to bring a side opening cut therein into such position that the work can be presented to the cutter. Upon the removal of the work from the cutter the guard is turned by the spring so as to cover its front part. The spring $c^{14}$ has one end, $c^{15}$, fastened to the block $c^{16}$, and the other end, $c^{17}$, to the sleeve $c^{13}$.

For grinding knives, there is attached to the rear end of the shaft $c$ an emery or other grinding wheel, E, and upon the bed of the machine, behind the wheel, there is arranged a post, $e$, upon which the cutter is placed, and which acts as a rest while it is being presented to the tool. In order that all the cutters may be ground at the various angles necessary, I have mounted the post upon the disk $e'$, which is secured by a stud, $e^2$, to the table, and has a slot, $e^3$, which permits the post $e$ to be moved eccentrically in relation to the stud $e^2$.

In operation, the boot or shoe having been heeled, the operator, standing in front of the machine, first presents the sole-edge to the sole-edge trimmer, and the edge and rand or welt are simultaneously trimmed in the ordinary way. Upon the completion of the sole-edge trimming the operator, without changing his position, presents the heel to the heel-trimming device, and this is done, as above explained, by placing the bottom of the heel against the surface $b^{18}$ of the guide and the edge of the top lift against the top-lift guide $b^{16}$, and by causing the rand-guide to bear upon the rand and the side of the heel to rest upon the heel-rest V. The boot or shoe is then turned to present its edge to the cutter. Two sections thereof are moved downward against the stress of the spring as the back part of the heel is being trimmed, and inward as the side sections are being operated upon, the cutter automatically accommodating itself to the variations in the length of the cut existing between the shortest surface operated upon at the breast of the heel and the longest at the extreme back of the heel. The heel having been trimmed, the operator, without changing his position, then presents the shank-edges to the shank-edge cutter, and the trimming of the sole and heel is thus completed.

It will be seen that during the operation of the trimming of the heel the other two cutters are covered or protected by their respective guards. It will be noticed that each cutter is so arranged in relation to the others as to permit its particular work to be done without interference with the others.

I do not confine myself in the operation of the machine to the sequence of operations herein mentioned, as the shank-edges may be trimmed first, or the heel, as may be preferred. I would further state that I do not confine the heel-trimmer to a two-part cutter.

One object of this machine being to completely trim the sole and heel of a shoe by one operator on one machine without requiring him to shift his place, it will be seen that the three tools must be located near each other, all in a space of a foot long or less. To allow the best work of the operator, they must be about the height of his waist, and the one doing the easiest work may be lower than the other two; but the range in height practically from highest to lowest is six inches or less. The fore-part trimmer needs the freest space for swinging the shoe and so should be the farthest from the frame of the machine. The heel-cutter needs more room than the shank-cutter and requires more power, and should have a rest and top-lift guard and guide near it. The entire space necessary to include all the cutters need not exceed ten inches in length and six inches in depth and width. By this compactness an operator may trim continuously all around the sole and heel without moving from his tracks.

Many of the details of the construction shown and described are contained in my simultaneously pending applications Nos. 205,202, 205,203, and 205,204, and the parts and combinations claimed herein are not claimed in them, and the parts and combinations claimed in them are not claimed herein.

Having thus fully described my invention, I claim and desire to secure by Letters Patent of the United States—

1. The combination of the shaft $a$ and sole-edge trimmer A, mounted thereon, the rand-guide $A^2$, carried or supported at the end of a slide-plate, $a^{14}$, said slide-plate, its screw-stud $a^{15}$, the support $a^5$, and the nuts $a^{17}$ $a^{19}$, substantially as described.

2. The combination of a rotary sole-edge cutter, the rand-guide having a hub arranged to enter a hole in a slide-plate, the said slide-plate rod $a^5$, the screw $a^{15}$, adjusting-nut $a^{17}$, and locking-nut $a^{19}$, substantially as specified.

3. The combination of the rotary sole-edge cutter with the guard A′, the rod $a^5$, supporting the same, the spring $a^8$, and stop $a^9$, substantially as described.

4. The combination of the part $b'$ of a two-part cutter having the head or disk $n$ and teeth $n^6$ integral therewith, a rotating shaft, $b$, having a shoulder, against which the said part $b'$ is locked by means of the nut $b^3$, which bears against the disk or head $n$ and is held in the cavity of the cutter, with the part $b^2$ of the cutter, a sleeve, $b^4$, arranged to be movable upon the outer end of the shaft, having a shoulder, to which the said part $b^2$ is secured by a nut, $b^5$, arranged to bear against its head and held within the cavity of this part of the cutter, a plate or arm, $b^6$, to which the sleeve is attached, and an independent support or rod, $b^8$, upon which said plate or arm is mounted to slide horizontally against the resistance or pressure of a spring, $b^9$, and said spring, substantially as described.

5. The combination of a rotary rand gage or guard, $b^{11}$, a rotary rand-cutter, $b^{10}$, a slide-plate, $b^{13}$, supporting the rand gage or guide, and a rotary heel-trimmer arranged so that the rand-cutter and rand gage or guide are moved simultaneously in relation to the heel cutter or trimmer, for the purpose of varying their position in relation to the cutting-edge of the trimmer, substantially as described.

6. The combination of a slide-plate, $b^{13}$, a rand gage or guide, $b^{11}$, carried thereby, the rand-cutter $b^{10}$, a rotating trimmer or cutter, and pins connecting the rand-guide and rand-cutter with the rotating cutter, whereby they are caused to be revolved thereby, substantially as described.

7. The combination of a rand trimmer or cutter, $b^{10}$, a rotating edge trimmer or cutter provided with large holes $m^9$, and one or more pins extending from the rand-cutter into said enlarged holes, whereby the rand-cutter is movable in relation to the main cutter or trimmer and adapted to be rotated thereby, but on a different center therefrom, substantially as described.

8. The combination of a member of a two-part cutter or trimmer fixed or secured to its operative shaft, the other member of the two-part cutter secured to a sleeve mounted upon said shaft and movable laterally in relation to the other member of the cutter, a slide-arm, $b^6$, for supporting said sleeve, a spring arranged to bear against said arm $b^6$ and movable therewith, a rand-guide, $b^{11}$, and a rand-cutter, $b^{10}$, supported by said slide-plate and movable therewith, all substantially as described.

9. The combination of a rotating cutter with a rest having a top-lift guide, $b^{16}$, the said rest having a large hole to embrace or receive the shaft of the trimmer and a shoulder thereon, and having also an arm extending to a support upon which it is movable for the purposes of adjustment, and a locking device for locking it thereto, substantially as described.

10. The combination of the two-part cutter $b'\ b^2$ with the movable rest V, substantially as described.

11. The combination of the two-part cutter, having one part movable in relation to the other, with the heel-rest horizontally movable at the same time as the movable part of the cutter, substantially as described.

12. The combination of a rotating two-part cutter, one of which parts is movable in relation to the other part, a rotating rand-knife connected with the movable part of the cutter and adapted to be moved therewith, and a heel-rest adapted to be moved simultaneously with said movable section of the cutter and said rand-knife, all arranged and operating substantially as described.

13. The shank-edge cutter having the edge-cutting section $c'$ extending to the line or point $c^3$, and beveled or cut away from the point or line $c^3$ to the point or line $c^4$, substantially as described.

14. The combination of the shank-edge cutter with the guard or hood $C^{12}$, having one side cut away and mounted upon the cutter-shaft to be rotated thereon, substantially as described.

15. The combination, with a rotating shank-edge cutter, of a guard or hood supported by the shaft of the cutter and having one side open or cut away, and a spring for rotating the guard or hood to return it to its normal position, substantially as described.

16. The combination of the rod $b^8$, an arm, $v$, suspended therefrom and having its lower section curved to extend beneath the heel trimmer or cutter, and the heel-rest V, formed near the lower end of said arm, with the heel trimmer or cutter, substantially as described.

17. An organized machine for trimming soles and heels in a series of successive steps, in which machine are comprised the three parallel rotating tool-carrying shafts and their special cutters for heel and edge trimming, which shafts are arranged relatively to each other in two horizontal and three vertical planes, and the tool-carrying ends of which shafts are arranged in three vertical planes transverse of their axes, as follows: the fore-part trimmer on the higher plane most remote from the front of the machine and most distant from the frame of the machine, the heel-trimmer on the higher plane nearer the operator and nearer the frame of the machine, and the shank-trimmer on the lower plane nearest the operator and nearest the frame of the machine, whereby the operator can completely trim without change of position, substantially as and for the purpose described.

18. An organized machine for trimming soles and heels in a series of successive steps, in which are comprised the two parallel rotating tool-carrying shafts and their special cutters for edge and heel trimming, which shafts are in the same horizontal plane, but in two vertical planes near each other, and the tool-carrying ends of which shafts extend laterally to different distances from the frame of the machine, that carrying the sole-trimmer being farther from the front of the machine and from the frame of the machine than that carrying the heel-trimmer, and the heel-trimmer having in combination therewith an adjustable top-lift rest and guide, substantially as described.

19. An organized machine for trimming soles and heels in a series of successive steps, in which are comprised the two parallel rotating tool-carrying shafts and their special cutters for edge and heel trimming, which shafts are in the same horizontal plane, but in two vertical planes near each other, and the tool-carrying ends of which shafts extend laterally to different distances from the frame of the machine, that carrying the sole-trimmer being farther from the front of the machine and from the frame of the machine than that carrying the heel-trimmer, and the heel-trimmer having in combination therewith a longitudinally-movable heel-rest, substantially as described.

20. An organized machine for trimming soles and heels by a series of successive steps, in which machine are comprised the two parallel rotating tool-carrying shafts and their special cutters for edge and heel trimming, which shafts are in the same horizontal plane, but in different vertical planes, the shaft carrying the heel-trimmer being nearest the front of the machine, and the tool-carrying ends of which shafts are extended to different distances laterally from the frames of the machine, that of the heel-trimmer to the less distance, and the heel-trimmer being combined with the heel-rest and an adjustable top-lift guard, substantially as described.

21. An organized machine for trimming soles and heels by a series of successive steps, in which machine are comprised two parallel rotating tool-carrying shafts and their special cutters for edge and heel trimming, which shafts are in the same horizontal plane, but in different vertical planes, and the tool-carrying ends of which shafts are extended laterally to different distances from the frame of the machine, the shaft of the heel-trimmer being nearer the front of the machine and the heel-trimmer being nearer the frame of the machine, and the edge-trimmer being provided with a sliding non-rotating finger-rest, substantially as described.

CHARLES H. TRASK.

Witnesses:
J. M. DOLAN,
FRED. B. DOLAN.